(12) United States Patent
Gupta et al.

(10) Patent No.: US 11,494,304 B2
(45) Date of Patent: Nov. 8, 2022

(54) INDICATING EXTENTS OF TRACKS IN MIRRORING QUEUES BASED ON INFORMATION GATHERED ON TRACKS IN EXTENTS IN CACHE

(71) Applicant: International Business Machines Corporation, Armonk, NY (US)

(72) Inventors: Lokesh Mohan Gupta, Tucson, AZ (US); Kevin J. Ash, Tucson, AZ (US); Kyler A. Anderson, Sahuarita, AZ (US); Matthew J. Kalos, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 208 days.

(21) Appl. No.: 16/819,038

(22) Filed: Mar. 13, 2020

(65) Prior Publication Data

US 2021/0286723 A1 Sep. 16, 2021

(51) Int. Cl.
  *G06F 12/00* (2006.01)
  *G06F 12/0804* (2016.01)
  *G06F 12/123* (2016.01)

(52) U.S. Cl.
  CPC ........ *G06F 12/0804* (2013.01); *G06F 12/123* (2013.01); *G06F 2212/1044* (2013.01); *G06F 2212/608* (2013.01)

(58) Field of Classification Search
  CPC ........ G06F 2212/1024; G06F 12/0895; G06F 13/1673; G06F 13/1689; G06F 12/0824; G06F 3/0656; G06F 12/123; G06F 11/1469; G06F 16/275; G06F 12/0804; G06F 2212/1044; G06F 2212/608
  See application file for complete search history.

(56) References Cited

U.S. PATENT DOCUMENTS 7,899,791 B1  3/2011  Gole
8,127,088 B2  2/2012  Kolovson
(Continued)

OTHER PUBLICATIONS

K. Beyls et al., "Reuse Distance-Based Cache Hint Selection" dated Aug. 2002, (online) retrieved from the Internet at URL>https://biblio.ugent.be/publication/160493/file/3239870, Total 10 pages.

*Primary Examiner* — David Yi
*Assistant Examiner* — Tahilba O Puche
(74) *Attorney, Agent, or Firm* — Konrad Raynes Davda & Victor LLP; David W. Victor

(57) ABSTRACT

Provided are a computer program product, system, and method for indicating extents of tracks in mirroring queues based on information gathered on tracks in extents in cache. Extent information on an extent of tracks in a cache indicated in an active cache list is processed in response to destaging a track from the active cache list to add to a demote list used to determine tracks to remove from the cache. The extent information is related to a number of modified tracks in an extent destaged from the active cache list. The extent information for the extent is used to determine one of a plurality of mirroring queues to indicate the extent including modified tracks. A mirroring queue having a higher priority than another mirroring queue is processed at a higher rate to determine extents of tracks to mirror from the cache to the secondary storage.

25 Claims, 7 Drawing Sheets

(56) References Cited

U.S. PATENT DOCUMENTS

| | | | |
|---|---|---|---|
| 8,190,561 B1* | 5/2012 | Poole | H04L 67/322 707/610 |
| 8,560,771 B2 | 10/2013 | Benhase et al. | |
| 9,063,945 B2 | 6/2015 | Benhase et al. | |
| 9,396,121 B2 | 7/2016 | Gupta et al. | |
| 9,507,527 B2 | 11/2016 | Benhase et al. | |
| 2004/0181632 A1* | 9/2004 | Factor | G06F 12/123 714/E11.107 |
| 2004/0181640 A1* | 9/2004 | Factor | G06F 11/2066 711/162 |
| 2005/0114460 A1* | 5/2005 | Chen | G06F 9/5038 709/207 |
| 2009/0006789 A1* | 1/2009 | LaFrese | G06F 11/2074 711/E12.001 |
| 2010/0042795 A1* | 2/2010 | Uchida | G06F 11/2058 711/162 |
| 2013/0254323 A1* | 9/2013 | Bhalerao | H04L 67/2852 709/213 |
| 2014/0365725 A1* | 12/2014 | Barrell | G06F 3/0604 711/113 |
| 2015/0067282 A1* | 3/2015 | Kobayashi | G06F 11/2074 711/158 |
| 2015/0242144 A1* | 8/2015 | Saito | G06F 3/0619 711/162 |
| 2016/0041779 A1* | 2/2016 | Kanai | G06F 3/0619 711/162 |
| 2017/0091109 A1* | 3/2017 | Ash | G06F 11/1076 |
| 2017/0185628 A1* | 6/2017 | Zakwieja | G06F 16/178 |
| 2019/0042096 A1* | 2/2019 | Anderson | G06F 3/065 |

* cited by examiner

Mirror Relationship

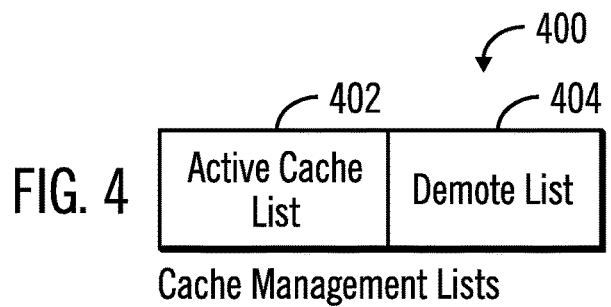
FIG. 4 Cache Management Lists
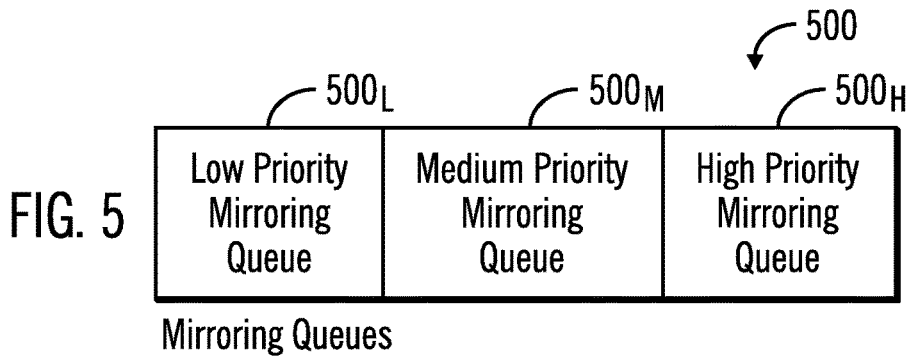
FIG. 5 Mirroring Queues
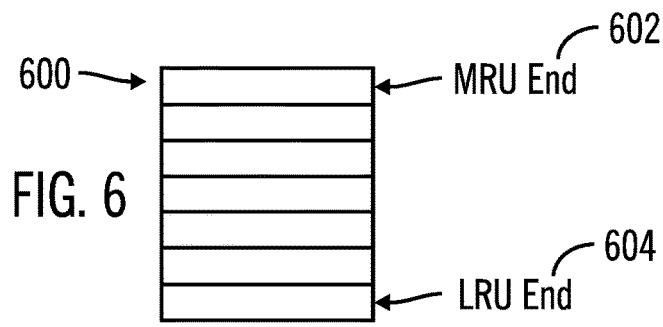
FIG. 6
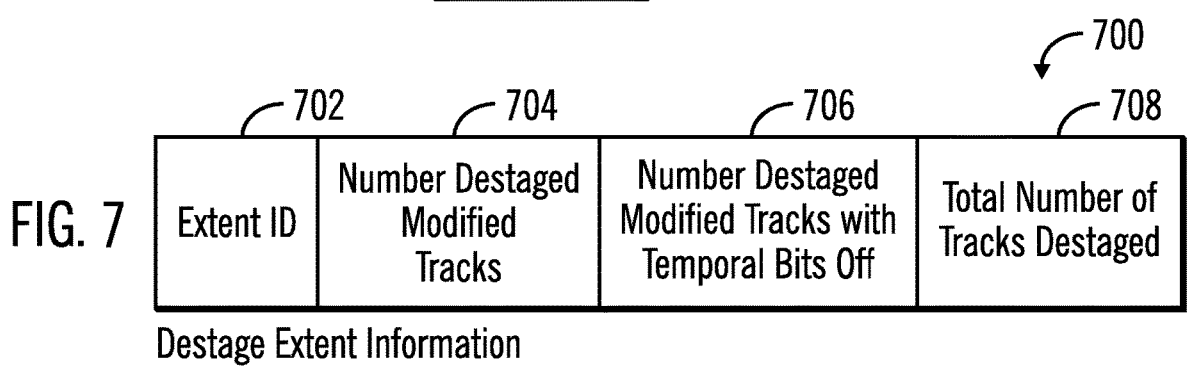
FIG. 7 Destage Extent Information
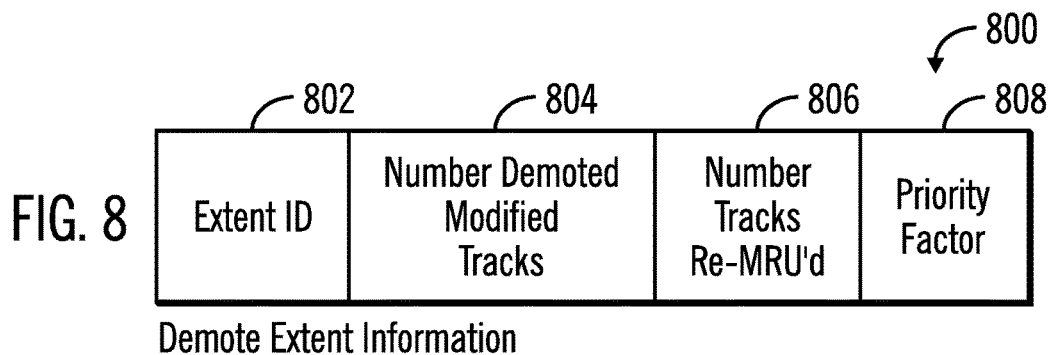
FIG. 8 Demote Extent Information

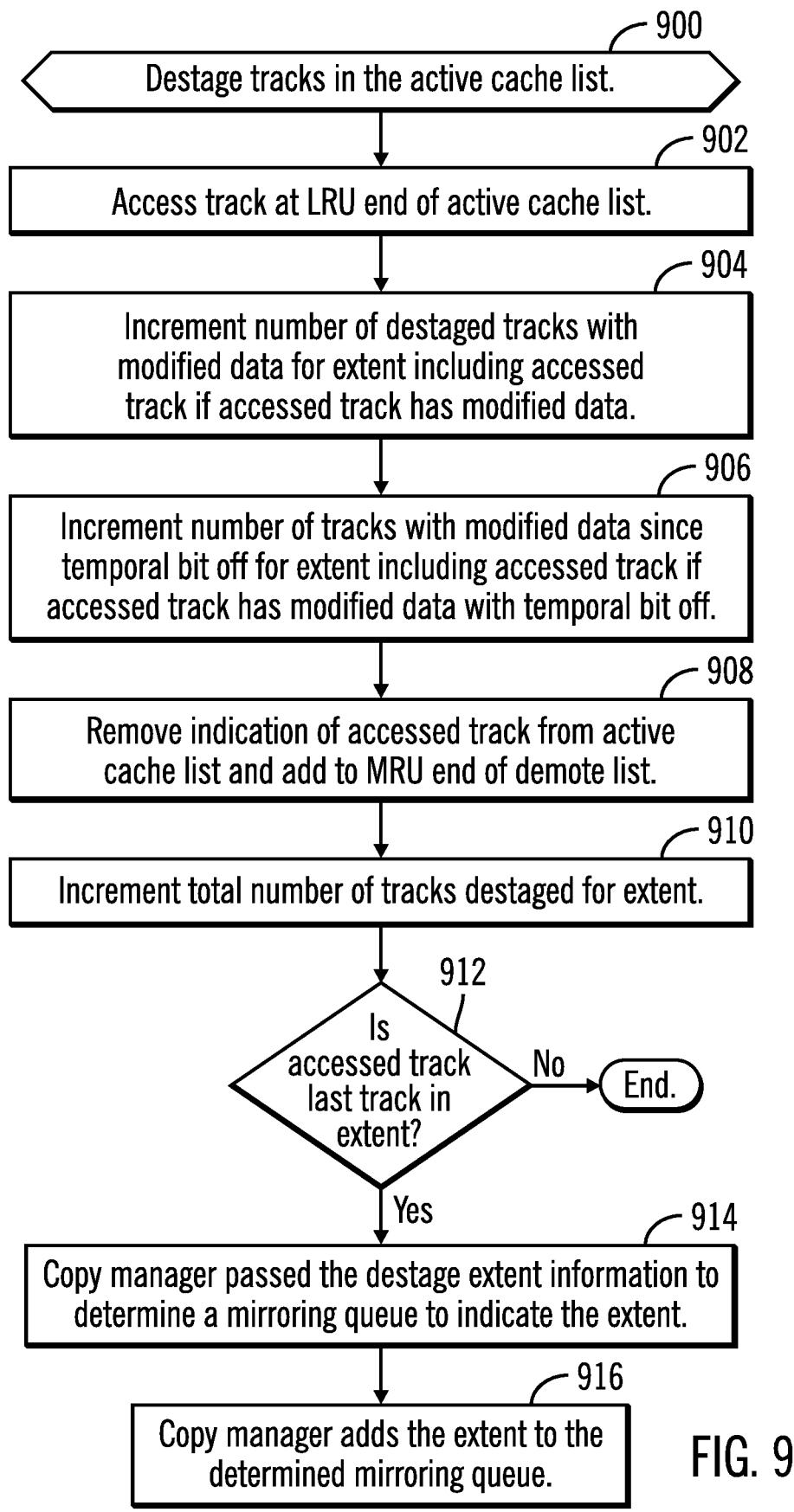

INDICATING EXTENTS OF TRACKS IN MIRRORING QUEUES BASED ON INFORMATION GATHERED ON TRACKS IN EXTENTS IN CACHE

BACKGROUND OF THE INVENTION

1. Field of the Invention

The present invention relates to a computer program product, system, and method for indicating extents of tracks in mirroring queues based on information gathered on tracks in extents in cache.

2. Description of the Related Art

Data backup systems can provide continuous availability of production data in the event of a sudden catastrophic failure at a single point in time or data loss over a period of time. In one such disaster recovery system, production data is replicated from a primary storage system to a secondary storage system. Different data replication technologies may be used for maintaining remote copies of data at a secondary site, such as International Business Machine Corporation's ("IBM") Metro Mirror Peer to Peer Remote Copy (PPRC), Extended Remote Copy (XRC), Coupled XRC (CXRC), Global Copy, and Global Mirror.

Cache management algorithms select tracks to demote, i.e., remove, from cache to free space in the cache for further data. However, if a track in cache in a mirror copy relationship waiting to be mirrored to a secondary storage system is demoted from cache before being transferred, then that track will have to be retrieved from storage to transfer to the secondary storage system. Retrieving the track from storage to mirror results in greater latency than to transfer the track directly from the cache to the mirror copy site.

There is a need in the art for improved techniques for mirroring tracks in cache to a secondary storage system.

SUMMARY

Provided are a computer program product, system, and method for indicating extents of tracks in mirroring queues based on information gathered on tracks in extents in cache. Extent information on an extent of tracks in a cache indicated in an active cache list is processed in response to destaging a track from the active cache list to add to a demote list used to determine tracks to remove from the cache. The extent information is related to a number of modified tracks in an extent destaged from the active cache list. The extent information for the extent is used to determine one of a plurality of mirroring queues to indicate the extent including modified tracks. A mirroring queue having a higher priority than another mirroring queue is processed at a higher rate to determine extents of tracks to mirror from the cache to the secondary storage.

With the above embodiment, an extent of tracks that is destaged having modified tracks is added to a mirroring queue so that the extent of tracks can be mirrored from cache to the secondary volume before the destaged extent is demoted or removed from cache. Extents are added to one of a plurality of mirroring queues based on their extent information, related to a number of modified tracks the extent has, so that tracks having relatively more modified tracks are on a higher priority mirroring queue to be processed at a faster rate of mirroring so that they may be mirrored to the secondary storage before being demoted and removed from the cache. Described embodiments optimize mirroring of tracks by increasing the likelihood modified tracks are mirrored to the secondary storage from the cache before being removed from the cache because mirroring from cache is substantially more efficient than having to retrieve the tracks in an extent from the primary storage to mirror to the secondary storage.

In a further embodiment, the extent information indicates a number of modified tracks in the extent destaged and additionally at least one of a total number of tracks destaged for the extent and a number of modified tracks in the extent destaged with temporal bits set to off, wherein a temporal bit indicates a duration of the track in the cache.

With the above embodiment, the extent information related to the number of modified tracks indicates a number of modified tracks in the extent destaged and further information, including the total number of tracks destaged for the extent and number of modified tracks with temporal bits set to off. This information indicates the likelihood modified tracks for the extent will be demoted and no longer available in cache because the greater the number of modified tracks and modified tracks having a temporal bit set to off, which indicates that the track is ready to be demoted, the greater the likelihood that the extent will have modified tracks demoted. Extents having more modified tracks ready to demote should be placed on a relatively higher priority mirroring queue to ensure they are mirrored at a relatively faster rate before being demoted from cache.

In a further embodiment, a mirroring queue having a higher priority than another mirroring queue is for extents having a greater number of modified tracks than the mirroring queue having a lower priority.

With the above embodiment, higher priority mirroring queues are for extents having a greater number of modified tracks than lower priority mirroring queues to ensure that those extents having more modified tracks, and hence a greater likelihood of having modified tracks demoted from the cache, are mirrored at a faster rate to the secondary storage to ensure tracks are mirrored from the cache instead of having to retrieve from the primary storage to mirror, which is less efficient than mirroring from cache.

In a further embodiment, the demote list comprises a least recently used (LRU) list having a most recently used (MRU) end. A determination is made as to whether a track indicated at the LRU end of the demote list has modified data and has not been added back to the MRU end from the LRU end while in the demote list. The track at the LRU end is moved to the MRU end in response to determining that the track at the LRU end has modified data and has not been added back to the MRU end from the LRU end while in the demote list. The track at the LRU end is removed in response to determining at least one of that the track does not have modified data and the track is modified and has been added back to the MRU end from the LRU end of the demote list.

With the above embodiment, a modified track in the demote list at the LRU end, which is ready to be the next track removed from the cache, is moved back to the MRU end to remain in the cache longer to provide additional time to allow the modified track to be mirrored from the cache to the secondary storage. Providing more time for a modified track to remain in the demote list by moving back to the MRU end from the LRU end increases the likelihood a track is mirrored from the cache, which reduces mirroring latency.

In a further embodiment, the extent information comprises destage extent information for extents destaged from the cache. Demote extent information indicates for extents indicated in the demote list a number of modified tracks in the extent. The demote extent information for an extent is used to determine whether to move indication of an extent in one of the mirroring queues to a higher priority mirroring queue associated with extents having a greater number of modified tracks.

The above embodiment provides demote extent information to use to adjust the mirroring queue in which extents are placed based on demote extent information for indicating modified tracks for an extent in a demote list. This allows an extent to be placed on a higher priority mirroring queue if the number of modified tracks in the extents increases while the extent is in the demote list to allow for the tracks in the extent to be mirrored at a higher priority rate to increase the likelihood they are mirrored before being demoted from the cache according to the demote list.

Further provided are a computer program product, system, and method for mirroring extents of tracks at a primary storage to a secondary storage. Extent information is maintained on an extent of tracks in cache that are indicated in a demote list indicating tracks to remove from the cache. The extent information is related to a number of modified tracks in the extent. The extent information for the extent is used to determine one of a plurality of mirroring queues to indicate the extent including modified tracks. Mirroring queues having a higher priority than other queues are processed at a greater rate to determine extents of tracks to mirror from the cache to the secondary storage.

With the above embodiment, an extent of tracks in the demote list waiting to be removed from cache are indicated in one of a plurality of mirroring queues based on extent information related to a number of modified tracks in the extent in the demote list. Extents are added to one of a plurality of mirroring queues based on their extent information, related to a number of modified tracks the extent has, so that tracks having relatively more modified tracks are on a higher priority mirroring queue to be processed at a faster rate of mirroring so that they may be mirrored to the secondary storage before being demoted and removed from the cache. Described embodiments increase the likelihood modified tracks are mirrored to a secondary storage from the cache before being removed from the cache because mirroring from cache is substantially more efficient than having to retrieve the tracks in an extent from the primary storage to mirror to the secondary storage.

BRIEF DESCRIPTION OF THE DRAWINGS

FIG. 4 illustrates an embodiment of cache management lists.

FIG. 5 illustrates an embodiment of mirroring queues of extents.

FIG. 6 illustrates an embodiment of a least recently used (LRU) list.

FIG. 7 illustrates an embodiment of destage extent information of extents destaged from an active cache list.

FIG. 8 illustrates an embodiment of demote extent information of tracks in extents in the demote list.

FIG. 9 illustrates an embodiment of operations to select tracks to destage from the active cache list.

DETAILED DESCRIPTION

In the prior art, a track in a mirror copy relationship may be demoted from cache before being transferred to secondary storage to replicate, which will require the retrieval of the track from storage to transfer. Described embodiments provide improvements to computer caching technology for mirroring tracks by indicating extents of tracks, destaged from cache and added to a demote list, in priority mirroring queues from which extents of tracks in cache are selected to mirror to a secondary storage. An extent is indicated in one of the mirroring queues based on information of extents destaged from the active cache list and added to the demote list including information on a number of destaged modified tracks. Extents having a greater number of modified destaged tracks are indicated in higher priority mirroring queues to process at a faster rate because such extents have a greater likelihood of having tracks demoted from cache. Further, described embodiments gather extent information on modified tracks in extents demoted from cache to determine whether to move an extent to a higher priority mirroring queue to reduce the time to wait to mirror to avoid that extent being demoted from cache before being mirrored.

By using priority mirroring queues to indicate extents of tracks for processing to mirror to a secondary storage, there is a greater likelihood that a modified track in cache will have been transferred to the secondary storage from cache before being demoted because the processing rate of extents to mirror is determined based on the number of modified tracks for an extent in the demote list.

Figure 1:
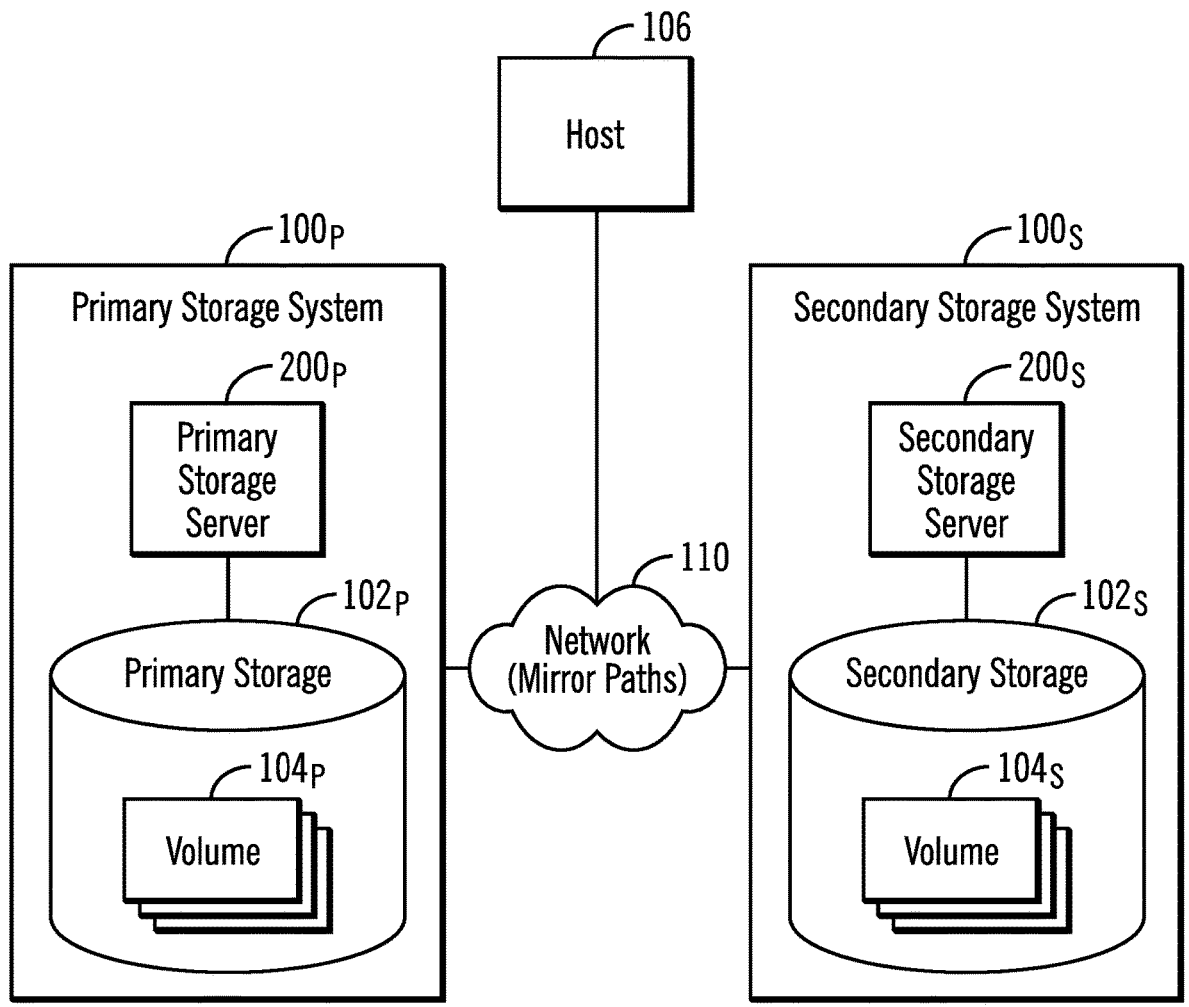
FIG. 1 illustrates an embodiment of a data replication environment.

FIG. 1 illustrates an embodiment of a data replication environment having a primary storage system $100_P$ including a primary storage server $200_P$ managing access to a primary storage $102_P$ and secondary storage system $100_S$, each including storage servers $200_P$ and $200_S$, respectively, managing access to volumes $104_P$ and $104_S$ configured in storages $102_P$ and $102_S$. One or more hosts 106 may direct I/O requests to the primary storage system $100_P$ or secondary storage system $100_S$, where the primary storage system $100_P$ may comprise a production storage to which most I/O requests are directed, and the secondary storage system $100_S$ is used mostly for mirroring data in case of a failover. The primary storage server $200_P$ may mirror data in the primary volumes $104_P$ to the secondary storage system $100_S$, also referred to a secondary storage or target storage, to maintain data in consistency groups at the second storage server $200_S$. Data may be written by the host 106 asynchronously, such that a write to a track in a mirror copy relationship at the primary storage server $200_P$ is considered complete when the data is stored in cache before being transferred to the secondary storage server $200_S$. The data may be mirrored over a network 110 having mirror paths for copying data between the primary storage system $100_P$ and the secondary storage system $100_S$.

Data in the volumes $104_P$, $104_S$ may be configured in ranks, where a rank is comprised of multiple extents, and wherein each extent is comprised of numerous tracks. Other storage units may be used than ranks, extents, and tracks. For instance, the volumes may comprise logical devices or drives configured in sections or partitions of storage other than ranks, that are comprised of groups of blocks or tracks.

The term "rank" as used herein may refer to any section or area of storage having groups of tracks or blocks, referred to as extents.

The term "storage system" as used herein may refer to a storage server $200_P$, $200_S$ and/or the storage $102_P$, $102_S$ managed by the server. The term "server" or "storage server" may be used to refer to the servers $200_P$, $200_S$.

The storages $102_P$, $102_S$ may comprise different types or classes of storage devices, such as magnetic hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. The volumes $104_P$, $104_S$ may further be configured from an array of devices, such as Just a Bunch of Disks (JBOD), Direct Access Storage Device (DASD), Redundant Array of Independent Disks (RAID) array, virtualization device, etc. Further, the storages $102_P$, $102_S$ may comprise heterogeneous storage devices from different vendors and different types of storage devices, such as a first type of storage devices, e.g., hard disk drives, that have a slower data transfer rate than a second type of storage devices, e.g., SSDs.

The network 110 used by the storage systems $100_P$ and $100_S$ to mirror data may comprise mirror paths configured in a storage network such as one or more interconnected Local Area Networks (LAN), Storage Area Networks (SAN), Wide Area Network (WAN), peer-to-peer network, wireless network, etc.

Figure 2:
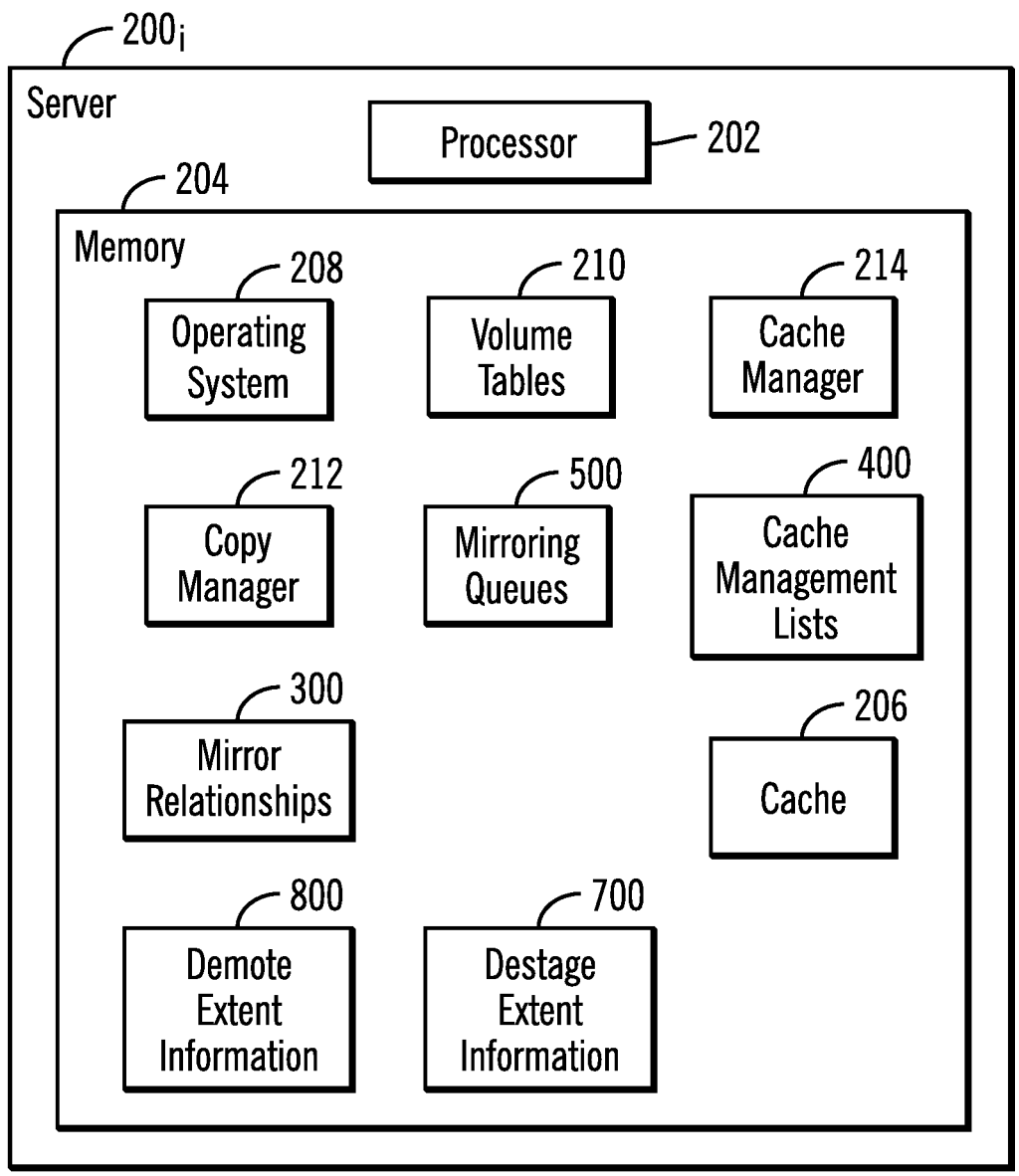
FIG. 2 illustrates an embodiment of components in a server in the replication environment of FIG. 1.

FIG. 2 provides an embodiment of components of a server $200_i$ involved in data mirroring, such as the primary storage server $200_P$ and secondary storage server $200_S$. The server $200_i$ includes a processor 202 and a memory 204 including programs executed by the processor 202 as well as a cache 206 to cache read and write data for the primary storage $102_P$. Modified data in the cache 206 in a mirror copy relationship may be copied to the secondary server $200_S$ to mirror data in a consistency group. The memory 204 includes an operating system 208, which configures and manages volumes in attached storage and maintains volume tables 210, such as a volume table of contents (VTOC), file allocation table, etc., providing information on the configured volumes $104_i$. The operating system 208 further manages I/O requests with respect to the volumes $104_i$.

The memory 204 includes a copy manager 212 to create and manage mirror copy relationships 300 of source data extents or tracks in primary volumes $104_P$ in the primary storage system $100_P$, also referred to as source storage, to target data extents in the secondary storage system $100_S$, also referred to as the target storage, as part of consistency groups. In one embodiment, the primary storage system $100_P$ may have the source storage and the secondary storage system $100_S$ may have the target storage of mirror copy relationships to mirror source volumes or other data units to corresponding target volumes or data units. The copy manager 212 may mirror extents of tracks in the primary volume $104_P$ asynchronously or synchronously to a secondary volume $104_S$ in the secondary storage $102_S$ over mirror paths in the network 110. Different data replication technologies may be used for the copy manager 212 to maintain remote copies of data at the secondary storage system $100_S$, such as International Business Machine Corporation's ("IBM") Metro Mirror Peer to Peer Remote Copy (PPRC), Extended Remote Copy (XRC), Coupled XRC (CXRC), Global Copy, and Global Mirror Copy, including programs provided by other vendors.

The server $200_i$ further includes a cache manager 214 that uses cache managements lists 400 to manage tracks in primary volumes $104_P$ that are stored in the cache 206 and determine when to demote tracks from cache 206 to free space in the cache 206 in a manner that optimizes the cache hit ratio. For modified tracks in the cache 206 in a mirror relationship 300, the cache manager 214 maintains destage extent information 700, such as related to a number of modified tracks in the extent, for tracks that are destaged and demote extent information 800 having information, such as related to a number of modified tracks in the extent, whose tracks are demoted and removed from the cache 206. The copy manager 212 receives the destage extent information 700 and demote extent information 800 to use to determine which of a plurality of mirroring queues 500 to indicate an extent destaged and demoted from the cache 206. The copy manager 212 processes the mirroring queues 500 to select extents of tracks to copy from the cache 206 over to the secondary storage $102_S$. The mirroring queues 500 may be associated with different priorities, such that the copy manager 212 processes extents in higher priority mirroring queues 500 at a greater rate than lower priority mirroring queues 500.

Tracks in the cache 206 have a sector bitmap indicating sectors of modified data in the track. The copy manager 212 uses the sector bitmap to only transfer modified sectors or data for a track from the cache 206 to the secondary storage $102_S$ to reduce latency and network 110 bandwidth of mirroring operations. If the track is demoted/removed from the cache 206, then the sector bitmaps are lost. In such case, to mirror the modified data in the track, the copy manager 212 needs to stage the entire track from the primary storage $102_P$ to cache 206 and then transfer the entire staged track to the secondary storage $102_S$ over the network 110. Thus, as tracks are added to a demote list to remove from the cache 206, the extents for the tracks are added to different priority queues 500 to have the extents with modified tracks transferred from the cache 206 to the secondary storage $102_S$ before being demoted from the cache 206.

The program components in the memory 204, including 208, 212, 214 are shown in FIG. 2 as program code loaded into the memory 204 and executed by the processor 202. Alternatively, some or all of the components functions may be implemented in hardware devices, such as in Application Specific Integrated Circuits (ASICs), Field Programmable Gate Array (FPGA) or executed by separate dedicated processors.

The memory 204 may comprise one or more memory devices volatile or non-volatile, such as a Dynamic Random Access Memory (DRAM), a phase change memory (PCM), Magnetoresistive random-access memory (MRAM), Spin Transfer Torque (STT)-MRAM, SRAM storage devices, DRAM, a ferroelectric random-access memory (FeTRAM), nanowire-based non-volatile memory, and Non-Volatile Direct In-Line Memory Modules (DIMMs), NAND storage, e.g., flash memory, Solid State Drive (SSD) storage, non-volatile RAM, etc.

Figure 3:
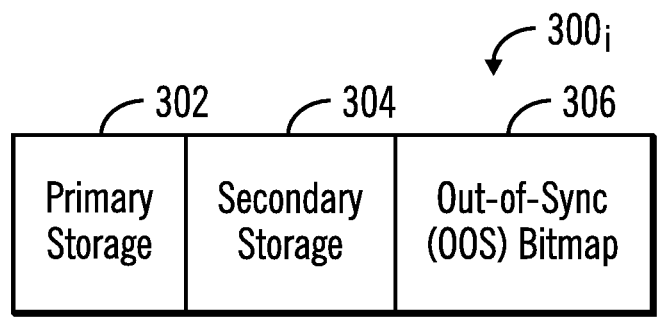
FIG. 3 illustrates an embodiment of a mirror relationship to copy tracks from a primary storage to a secondary storage.

FIG. 3 illustrates an embodiment of an instance of a mirror relationship $300_i$ in the mirror relationships 300 having information on a mirror copy relationship between a primary storage 302 and a secondary storage 304 and an out-of-sync (OOS) bitmap 306. The OOS bitmap 306 includes a bit for each track in the primary storage 302 to mirror to the secondary storage 304, and indicates whether a track corresponding to a bit needs to be copied from the primary storage 302 to the secondary storage 304 or does not need to be copied. The bit for a modified track may be set to cause the modified track to be copied to the mirror copy in the secondary storage 304 to maintain data consistency.

FIG. 4 illustrates an embodiment of cache management lists 400, including an active cache list 402 indicating modified and unmodified tracks in the cache 206 and a demote list 404 indicating tracks to demote and remove from the cache 206 after they are destaged. A track is selected from the active cache list 402 to destage and remove from the active cache list 402 to add to the demote list 404. A track is selected from the demote list 404 to demote/remove from the cache 206.

In one embodiment, the cache manager 214 may use Intelligent Write Caching (IWC) to sort modified data in the active cache list 402, where each track has a temporal value indicating a duration the track has been in cache. When the temporal value is decreased to zero, the track can be destaged from cache 206. There may also be a separate least recently used (LRU) cache list for modified tracks.

FIG. 5 illustrates an embodiment of mirroring queues 500 as having a low priority mirroring queue $500_L$, a medium priority mirroring queue $500_M$, and a high priority mirroring queue $500_H$. The higher priority queue is processed at a higher rate than lower priority queues. For instance, the copy manager 212 may alternate processing between the mirroring queues $500_L$, $500_M$, $500_H$, where a greater number of extents are processed in the high priority queue $500_H$ than both the medium priority queue $500_M$ and low priority queue $500_L$, and a greater number of extents are processed in the medium priority queue $500_M$ than the low priority queue $500_L$. There may be additional mirroring priority queues. Further, after mirroring an extent to the secondary storage $102_S$, the tracks in the extent are indicated as not having modified data so they will not be subject to further mirroring until modified again.

In certain embodiments, extents of tracks are indicated in one of the mirroring priority queues 500 when all of the tracks in an extent are destaged from the active cache list 402 based on the destage extent information 700 maintained for the extent destaged from the cache 206. An extent of tracks may further be moved to a higher priority mirroring queue 500 while an extent is indicated on the demote list 404 based on demote extent information 800.

FIG. 6 illustrates an embodiment of a cache list 600, such as one of cache lists and queues 402, 404, $500_L$, $500_M$, $500_H$ that comprises a temporal ordered list of entries indicating tracks to demote from cache, with a most recently used (MRU) end 602 having most recently accessed tracks in the cache 206 and a least recently used (LRU) end 604 having oldest or least recently used track in the cache 206. Tracks are added at the MRU end 602 of the cache list and demoted from the LRU end 604.

FIG. 7 illustrates an embodiment of destage extent information 700 having information on an extent whose tracks are destaged from the active cache list 402, including an extent identifier (ID) 702, a number of destaged modified tracks 704 in the extent 702, a number of destaged modified tracks in the extent with temporal bits off 706, and a total number of tracks destaged 708 for the extent 702.

FIG. 8 illustrates an embodiment of demote extent information 800 provided for extents on the demote list 404 to use to determine if extents on the demote list 404 should be moved to a higher priority mirroring queue 500 than the mirroring queue 500 currently indicating the extent. The demote extent information 800 includes an extent ID 802; a number of demoted modified tracks 804; a number of tracks re-MRU'd 806; and a priority factor 808 calculated as a function of the variables 804 and 806. A track on the demote list 404 at the LRU end 604 having modified sectors is re-MRU'd by moving indication of the track at the LRU end 604 to the MRU end 602 to allow the modified track to remain in cache 206 on the demote list 404 longer to provide time for the copy manager 212 to mirror the track in the cache 206 to the secondary storage $102_S$.

A track control block would include a sector bitmap of modified sectors in the track to transfer to the secondary storage $102_S$ and a re-MRU flag indicating if the track was re-MRU'd, where a track may only be re-MRU'd once on the demote list 404 before being demoted.

FIG. 9 illustrates an embodiment of operations performed by the cache manager 214 to select tracks to destage from the active cache list 402. Upon initiating (at block 900) a destage operation, the cache manager 214 accesses (at block 902) a track at the LRU end 604 of the active cache list 402. The cache manager 214 increments (at block 904) the number of destaged modified tracks 704 for the extent including the accessed track if the accessed track has modified data. The number of tracks with modified data since temporal bit off 706 is incremented (at block 906) if the accessed track has modified data with the temporal bit off. The cache manager 214 removes (at block 908) indication of the accessed track from the active cache list 402 and adds to the MRU end 602 of the demote list 404. The total number of tracks destaged 708 for the extent including the accessed track is incremented (at block 910). If (at block 912) the accessed track is the last track in an extent, which means the extent itself is being destaged, then the cache manager 214 passes (at block 914) the destage extent information 700, for the extent including the accessed track, to the copy manager 212 to determine a mirroring queue 500 in which to indicate the extent just destaged. The copy manager 212 adds (at block 916) the extent to the determined mirroring queue 500.

In one embodiment, to determine a high $500_H$, medium $500_M$ or low $500_L$ mirroring queue, the number of destaged modified tracks 704 value for the extent may be used to determine which of the low $500_L$ or medium $500_M$ mirroring queue to use if the value 704 exceeds a threshold. The number of destaged modified tracks with the temporal bit off 706 can be used to determine whether to add the extent to the high mirroring queue $500_H$ if the value 706 exceeds another threshold. The total number of tracks destaged 708 may also be used to determine a priority queue, where a greater number of tracks destaged indicates that a higher priority mirroring queue should be used. Alternatively, different ranges of values for the statistics 704, 706, 708 may be associated with each of the mirroring queues $500_L$, $500_M$, $500_H$ to allow a determination of the mirroring queue to use for the destaged extent based on the statistics. Other techniques may be used to select one of the mirroring queues $500_L$, $500_M$, $500_H$ for an extent based on different combinations or aggregations of the extent information 704, 706, and 708.

With the embodiment of FIG. 9, an extent whose tracks are destaged from cache 206, may be added to a mirroring queue $500_L$, $500_M$, $500_H$ based on extent information collected for the extent, including information based on a number of destaged tracks of modified data for the extent. An extent having a relatively higher number of destaged tracks of modified data is placed on a relatively higher priority queue to increase the likelihood the modified data in tracks of the extent to mirror have not been demoted from the cache 206. Mirroring modified data (sectors) of tracks from cache 206 reduces latency and lowers bandwidth of the transfer in that only sectors of tracks in the extent having modified data are transferred to the secondary storage $102_S$.

Figure 10:
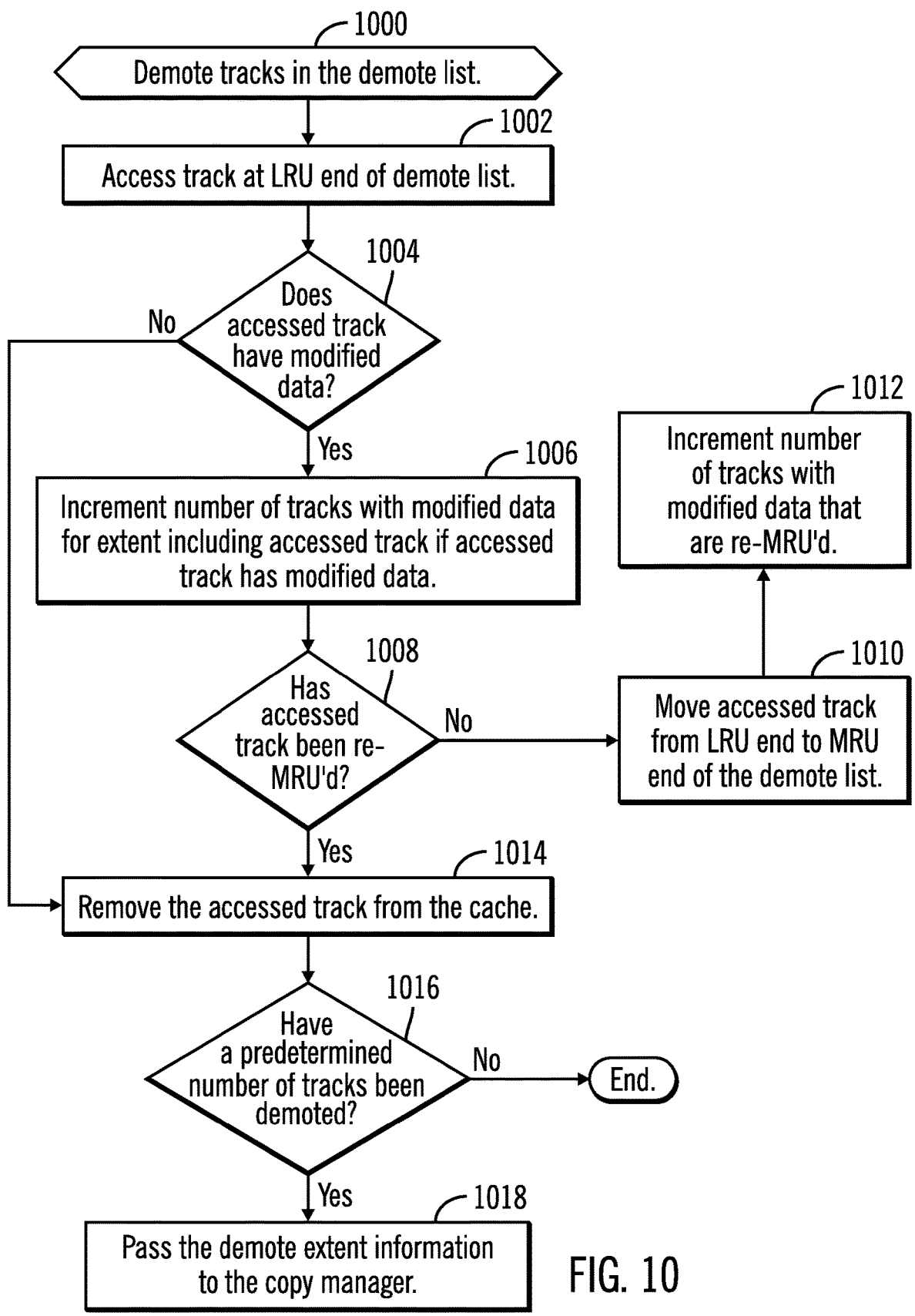
FIG. 10 illustrates an embodiment of operations to demote tracks from the demote list.

FIG. 10 illustrates an embodiment of operations performed by the cache manager 214 to demote tracks in the demote list 404. Upon initiating (at block 1000) demotion of tracks from the demote list 404, the cache manager 214 accesses (at block 1002) a track at the LRU end 604 of the demote list 404. If (at block 1004) the accessed track has modified data, then the number of demoted modified tracks 804 is incremented (at block 1006). If (at block 1008) the accessed track has not yet been re-MRU'd, i.e., not once moved back to the MRU end 602 of the demote list 404 while in the demote list 404, then the accessed track is moved (at block 1010) from the LRU end 604 to the MRU end 602 of the demote list 404 and the number of tracks with modified data that are re-MRU'd 806 is incremented (at block 1012). If (at block 1008) the accessed track has already been re-MRU'd or if (at block 1004) the accessed track does not have modified data, then the accessed track is removed (at block 1014) from the cache 206, and LRU end 604 of the demote list 404.

If (at block 1016) a predetermined number of tracks have been demoted from the demote list 404, i.e., a predetermined number of demote scans, then the cache manager 214 passes (at block 1018) the demote extent information 800 to the copy manager 212 to use to determine whether to move the extents, for which the demote extent information 800 is provided, to a higher priority mirroring queue 500.

With the embodiment of operations of FIG. 10, the cache manager 214 will re-MRU a modified track if it reaches the LRU end 604 of the demote list 404 one time to allow that track to remain in cache 206 longer so that the copy manager 212 may mirror the track from cache 206 to the secondary storage $102_S$ before it is demoted from cache 206. Further, the cache manager 214 gathers information on demoted tracks that may be used to optimize the selection of the mirroring queue 500 to indicate the extents of tracks to increase the likelihood extents having modified tracks are mirrored to the secondary storage $102_S$ before being demoted.

Figure 11:
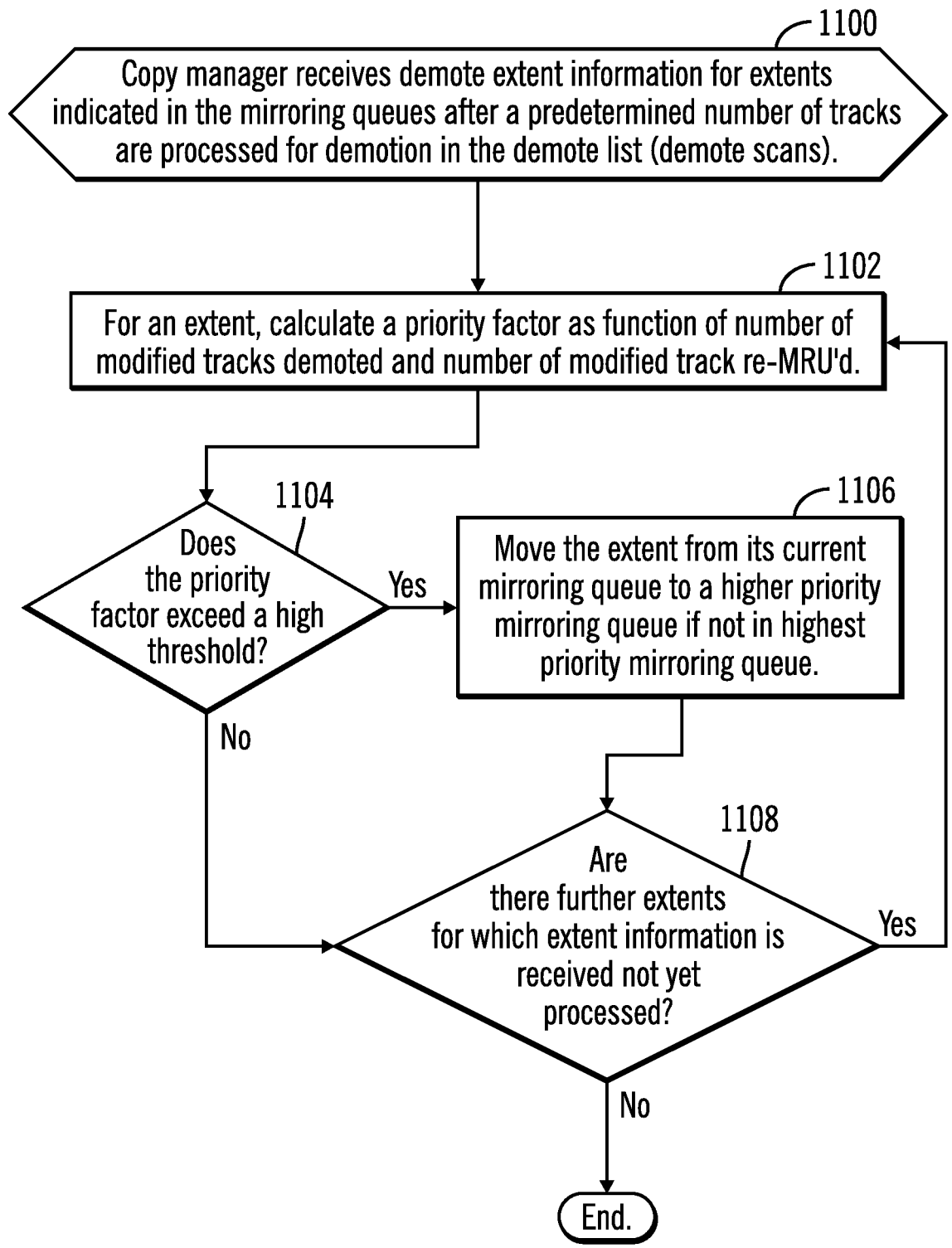
FIG. 11 illustrates an embodiment of operations to determine whether to move an extent to a higher priority mirroring queue based on demote extent information.

FIG. 11 illustrates an embodiment of operations performed by the copy manager 212 to process received demote extent information 800 for extents indicated in the mirroring queues 500 after a predetermined number of tracks are processed for demotion in the demote list 404. Upon receiving (at block 1100) the demote extent information 800, the copy manager 212 calculates (at block 1102) a priority factor 808 for an extent as function of the number of demoted modified tracks 804 and the number of modified tracks re-MRU'd 806 for the extent. For instance, in one embodiment, the priority factor 808 may be calculated as equation (1) below:

((Number of demoted tracks with modified data)
\*N)+((Number of tracks Re-MRU'd)\*M),
where N and M are constants determined
experimentally. (1)

If (at block 1104) the priority factor 808 exceeds a high threshold, indicating there are a relatively large number of tracks in the extent ready to be demoted, as evidenced by the number of demoted tracks of modified data and number of tracks re-MRU'd, then the extent is moved (at block 1106) from its current mirroring queue 500, to a higher priority mirroring queue $500_j$ if the current mirroring queue $500_i$ is not of the highest priority. After moving the extent to a higher priority mirroring queue $500_j$ or if (at block 1104) the priority factor 808 does not exceed the high threshold, if (at block 1108) there are further extents for which the demote extent information 800 is not yet processed, then control proceeds back to block 1102 to process demote extent information for a next extent in one of the mirroring queues $500_i$. Otherwise, if all the demote extent information 800 is processed, control ends.

With the operations of FIG. 11, the copy manager 212 receives hints on the performance of extents in the mirroring queues 500 in the form of the received demote extent information 800. Extent information indicating a relatively higher number of demoted modified tracks 804 in an extent and a higher number of Re-MRU'd tracks 806 in an extent indicates that the tracks in the extent are likely to be demoted sooner from the cache 206 than extents having a relatively lower of these numbers 804, 806. Extents with relatively higher of the values 804, 806 may be moved to a higher priority mirroring queue 500 to increase the likelihood these extents are mirrored before demoted from the cache 206. The copy manager 212 may move extents to higher priority queues so that they will more likely be processed and transferred from the cache 206 to the secondary storage $102_S$ before being demoted.

In described embodiments, destage extent information 700 is used to determine a priority mirroring queue 500 in which to indicate an extent destaged from the active cache list 402 to the demote list 404 and demote extent information 800 is used to determine whether to move an extent to a higher priority mirroring queue 500 based on the number of modified tracks in the extent demoted and the number of tracks re-MRU'd.

In an alternative embodiment, only one of the destage 700 or demote 800 extent information may be used to determine the mirroring queue 500 in which to indicate an extent. For instance, in one embodiment, there may be only destage extent information 700 used to determine a mirroring queue 500 in which to indicate an extent whose last track is destaged from the active cache list 402 without the demote extent information 800 used to move the extent to a higher priority queue 500, such as according to the operations of FIGS. 10 and 11.

In a further implementation, the demote extent information 800 is used to determine the mirroring queue 500 in which to indicate extents, such that each of the mirroring queues 500 are associated with a different range of priority factors used to determine the mirroring queue to indicate extents, without consideration of destage extent information 700 to determine an initial placement of extents in the mirroring queues 500.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 12:
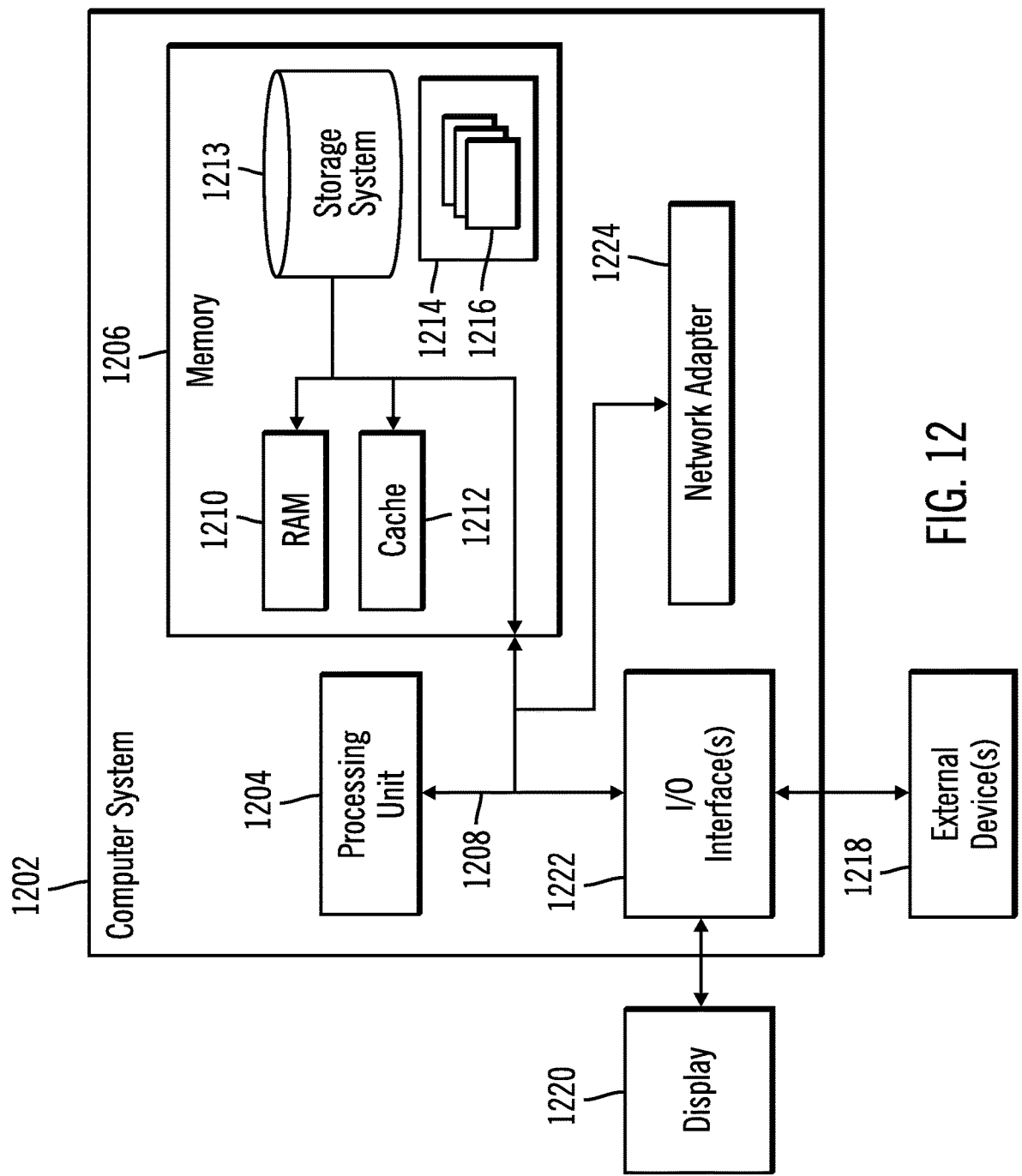
FIG. 12 illustrates a computing environment in which the components of FIG. 1 may be implemented.

The computational components of FIG. 1, including the host 106 and servers $200_P$, $200_S$ may be implemented in one or more computer systems, such as the computer system 1202 shown in FIG. 12. Computer system/server 1202 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1202 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, the computer system/server 1202 is shown in the form of a general-purpose computing device. The components of computer system/server 1202 may include, but are not limited to, one or more processors or processing units 1204, a system memory 1206, and a bus 1208 that couples various system components including system memory 1206 to processor 1204. Bus 1208 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1202 typically includes a variety of computer system readable media. Such media may be any available media that is accessible by computer system/server 1202, and it includes both volatile and non-volatile media, removable and non-removable media.

System memory 1206 can include computer system readable media in the form of volatile memory, such as random access memory (RAM) 1210 and/or cache memory 1212. Computer system/server 1202 may further include other removable/non-removable, volatile/non-volatile computer system storage media. By way of example only, storage system 1213 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1208 by one or more data media interfaces. As will be further depicted and described below, memory 1206 may include at least one program product having a set (e.g., at least one) of program modules that are configured to carry out the functions of embodiments of the invention.

Program/utility 1214, having a set (at least one) of program modules 1216, may be stored in memory 1206 by way of example, and not limitation, as well as an operating system, one or more application programs, other program modules, and program data. Each of the operating system, one or more application programs, other program modules, and program data or some combination thereof, may include an implementation of a networking environment. The components of the computer 1202 may be implemented as program modules 1216 which generally carry out the functions and/or methodologies of embodiments of the invention as described herein. The systems of FIG. 1 may be implemented in one or more computer systems 1202, where if they are implemented in multiple computer systems 1202, then the computer systems may communicate over a network.

Computer system/server 1202 may also communicate with one or more external devices 1218 such as a keyboard, a pointing device, a display 1220, etc.; one or more devices that enable a user to interact with computer system/server 1202; and/or any devices (e.g., network card, modem, etc.) that enable computer system/server 1202 to communicate with one or more other computing devices. Such communication can occur via Input/Output (I/O) interfaces 1222. Still yet, computer system/server 1202 can communicate with one or more networks such as a local area network (LAN), a general wide area network (WAN), and/or a public network (e.g., the Internet) via network adapter 1224. As depicted, network adapter 1224 communicates with the other components of computer system/server 1202 via bus 1208. It should be understood that although not shown, other hardware and/or software components could be used in conjunction with computer system/server 1202. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

EXAMPLES

The following pertains to further embodiments.

Example 1 is a method for mirroring extents of tracks at a primary storage to a secondary storage. Extent information on an extent of tracks in a cache indicated in an active cache list is processed in response to destaging a track from the active cache list to add to a demote list used to determine tracks to remove from the cache. The extent information is related to a number of modified tracks in an extent destaged from the active cache list. The extent information for the extent is used to determine one of a plurality of mirroring queues to indicate the extent including modified tracks. A mirroring queue having a higher priority than another mirroring queue is processed at a higher rate to determine extents of tracks to mirror from the cache to the secondary storage.

In Example 2, the subject matter of Example 1 can optionally include that the extent information indicates a number of modified tracks in the extent destaged and additionally at least one of a total number of tracks destaged for the extent and a number of modified tracks in the extent destaged with temporal bits set to off. A temporal bit indicates a duration of the track in the cache.

In Example 3, the subject matter of Examples 1 and 2 can optionally include that a mirroring queue having a higher priority than another mirroring queue is for extents having a greater number of modified tracks than the mirroring queue having a lower priority.

In Example 4, the subject matter of Examples 1-3 can optionally include that each of the mirroring queues is associated with a range of values related to modified tracks in the extent, wherein a mirroring queue has a higher range of values than a mirroring queue associated with a lower priority.

In Example 5, the subject matter of Examples 1-4 can optionally include that the demote list comprises a least recently used (LRU) list having a most recently used (MRU) end. A determination is made as to whether a track indicated at the LRU end of the demote list has modified data and has not been added back to the MRU end from the LRU end while in the demote list. The track at the LRU end is moved to the MRU end in response to determining that the track at the LRU end has modified data and has not been added back to the MRU end from the LRU end while in the demote list. The track at the LRU end is removed in response to determining at least one of that the track does not have modified data and the track is modified and has been added back to the MRU end from the LRU end of the demote list.

In Example 6, the subject matter of Examples 1-5 can optionally include indicating that tracks in an extent do not have modified data in response to processing the extent in one of the mirroring queues to transfer the modified data in the tracks in the extent to the secondary storage.

In Example 7, the subject matter of Examples 1-6 can optionally include that the extent information comprises destage extent information for extents destaged from the cache. Demote extent information indicates for extents indicated in the demote list a number of modified tracks in the extent. The demote extent information for an extent is used to determine whether to move indication of an extent in one of the mirroring queues to a higher priority mirroring queue associated with extents having a greater number of modified tracks.

In Example 8, the subject matter of Examples 1-7 can optionally include that the using the demote extent information for the extent to determine one of the mirroring queues in which to indicate the extent comprises calculating a priority factor based on the demote extent information and moving indication of the extent to a higher priority queue in response to determining that the priority factor exceeds a threshold.

In Example 9, the subject matter of Examples 1-8 can optionally include that the demote extent information indicates for each extent a number of modified tracks in the extent demoted from the demote list and a number of modified tracks moved from a least recently used (LRU) end of the demote list to a most recently end (MRU) of the demote list. The priority factor is calculated as a function of the number of modified tracks in the extent demoted and the number of modified tracks moved from the LRU end to the MRU end.

Example 10 is a method for mirroring extents at a primary storage to a secondary storage. Extent information is maintained on an extent of tracks in cache that are indicated in a demote list indicating tracks to remove from the cache. The extent information is related to a number of modified tracks in the extent. The extent information for the extent is used to determine one of a plurality of mirroring queues to indicate the extent including modified tracks, wherein mirroring queues having a higher priority than other queues are processed at a greater rate to determine extents of tracks to mirror from the cache to the secondary storage.

In Example 11, the subject matter of claim 10 can optionally include processing a plurality of tracks in extents in the demote list to remove from the cache. The extent information is gathered for extents based on a status of the tracks in the extents when processed in the demote list to remove from the cache.

Example 12 is a system comprising one or more processors and one or more computer-readable storage media collectively storing program instructions which, when executed by the processor, are configured to cause the processor to perform the operations according to any of Examples 1 through 11.

Example 13 is a computer program product comprising one or more computer readable storage media, and program instructions collectively stored on the one or more computer readable storage media, the program instructions comprising instructions configured to cause one or more processors to perform the operations according to any one of Examples 1 through 11.

What is claimed is:

1. A computer program product for mirroring extents of tracks at a primary storage to a secondary storage, wherein the computer program product comprises a computer readable storage medium having program instructions executable by a processor to cause operations, the operations comprising:
   incrementing a number of destaged modified tracks in extent information for an extent of tracks in a cache in response to destaging a modified track of the extent, wherein the modified track is indicated in an active cache list;
   indicating the destaged modified track in a demote list, wherein the demote list is used to determine destaged modified tracks to remove from the cache; and
   using the extent information for the extent to determine one of a plurality of mirroring queues in which to indicate the extent, wherein a mirroring queue having a higher priority than another mirroring queue is processed at a higher rate to determine extents of tracks to mirror from the cache to the secondary storage.

2. The computer program product of claim 1, wherein the extent information additionally indicates at least one of a total number of tracks destaged for the extent and a number of modified tracks in the extent destaged with temporal bits set to off, wherein a temporal bit indicates a duration of a track in the cache.

3. The computer program product of claim 1, wherein a mirroring queue having a higher priority than another mirroring queue is for extents having a greater number of modified tracks than extents in the mirroring queue having a lower priority.

4. The computer program product of claim 1, wherein the mirroring queues are associated with ranges of values related to modified tracks in the extent, wherein a mirroring queue has a higher range of values than a range of values of a mirroring queue associated with a lower priority.

5. The computer program product of claim 1, wherein the demote list comprises a least recently used (LRU) list having a most recently used (MRU) end, wherein the operations further comprise:
determining whether a track indicated at an LRU end of the demote list has modified data and has not been added back to the MRU end from the LRU end while in the demote list;
moving the track at the LRU end to the MRU end in response to determining that the track at the LRU end has modified data and has not been added back to the MRU end from the LRU end while in the demote list; and
removing the track at the LRU end in response to determining at least one of that the track does not have modified data and the track is modified and has been added back to the MRU end from the LRU end of the demote list.

6. The computer program product of claim 1, wherein the operations further comprise:
indicating that tracks in the extent do not have modified data in response to processing the extent in one of the mirroring queues to transfer modified data in the tracks in the extent to the secondary storage.

7. The computer program product of claim 1, wherein the extent information comprises destage extent information for extents destaged from the cache, wherein the operations further comprise:
maintaining demote extent information that indicates for extents indicated in the demote list a number of modified tracks in the extent; and
using the demote extent information for an extent to determine whether to move indication of an extent in one of the mirroring queues to a higher priority mirroring queue associated with extents having a greater number of modified tracks.

8. The computer program product of claim 7, wherein the using the demote extent information for the extent to determine one of the mirroring queues in which to indicate the extent comprises:
calculating a priority factor based on the demote extent information; and
moving indication of the extent to a higher priority queue in response to determining that the priority factor exceeds a threshold.

9. The computer program product of claim 8, wherein the demote extent information indicates, for an extent, a number of modified tracks in the extent demoted from the demote list and a number of modified tracks moved from a least recently used (LRU) end of the demote list to a most recently end (MRU) of the demote list, wherein the priority factor is calculated as a function of the number of modified tracks in the extent demoted and the number of modified tracks moved from the LRU end to the MRU end.

10. A computer program product for mirroring extents at a primary storage to a secondary storage, wherein the computer program product comprises a computer readable storage medium having program instructions executable by a processor to cause operations, the operations comprising:
in response to destaging a modified track of an extent, indicating the destaged modified track in a demote list;
incrementing a number of destaged modified tracks in the demote list in extent information for an extent of tracks in cache,
wherein the demote list indicates destaged tracks to remove from the cache; and
using the extent information for the extent to determine one of a plurality of mirroring queues in which to indicate the extent including destaged modified tracks, wherein mirroring queues having a higher priority than other queues are processed at a greater rate to determine extents of tracks to mirror from the cache to the secondary storage.

11. The computer program product of claim 10, wherein the operations further comprise:
processing a plurality of tracks in extents in the demote list to remove from the cache, wherein the extent information is gathered for the extents based on a status of the tracks in the extents when processed in the demote list to remove from the cache.

12. A system for mirroring extents of tracks at a primary storage to a secondary storage, comprising:
a processor; and
a computer readable storage medium having program instructions that when executed by the processor causes operations, the operations comprising:
incrementing a number of destaged modified tracks in extent information for an extent of tracks in a cache in response to destaging a modified track of the extent, wherein the modified track is indicated in an active cache list;
indicating the destaged modified track in a demote list, wherein the demote list is used to determine destaged modified tracks to remove from the cache; and
using the extent information for the extent to determine one of a plurality of mirroring queues in which to indicate the extent, wherein a mirroring queue having a higher priority than another mirroring queue is processed at a higher rate to determine extents of tracks to mirror from the cache to the secondary storage.

13. The system of claim 12, wherein the extent information additionally indicates at least one of a total number of tracks destaged for the extent and a number of modified tracks in the extent destaged with temporal bits set to off, wherein a temporal bit indicates a duration of a track in the cache.

14. The system of claim 12, wherein a mirroring queue having a higher priority than another mirroring queue is for extents having a greater number of modified tracks than extents in the mirroring queue having a lower priority.

15. The system of claim 12, wherein the demote list comprises a least recently used (LRU) list having a most recently used (MRU) end, wherein the operations further comprise:
determining whether a track indicated at an LRU end of the demote list has modified data and has not been added back to the MRU end from the LRU end while in the demote list;
moving the track at the LRU end to the MRU end in response to determining that the track at the LRU end has modified data and has not been added back to the MRU end from the LRU end while in the demote list; and
removing the track at the LRU end in response to determining at least one of that the track does not have modified data and the track is modified and has been added back to the MRU end from the LRU end of the demote list.

16. The system of claim 12, wherein the extent information comprises destage extent information for extents destaged from the cache, wherein the operations further comprise:
- maintaining demote extent information that indicates for extents indicated in the demote list a number of modified tracks in the extent; and
- using the demote extent information for an extent to determine whether to move indication of an extent in one of the mirroring queues to a higher priority mirroring queue associated with extents having a greater number of modified tracks.

17. The system of claim 16, wherein the using the demote extent information for the extent to determine one of the mirroring queues in which to indicate the extent comprises:
- calculating a priority factor based on the demote extent information; and
- moving indication of the extent to a higher priority queue in response to determining that the priority factor exceeds a threshold.

18. A system for mirroring extents of tracks at a primary storage to a secondary storage, comprising: a processor; and a computer readable storage medium having program instructions that when executed by the processor causes operations, the operations comprising:
- in response to destaging a modified track of an extent, indicating the destaged modified track in a demote list;
- incrementing a number of destaged modified tracks in the demote list in extent information for an extent of tracks in cache, wherein the demote list indicates destaged tracks to remove from the cache; and using the extent information for the extent to determine one of a plurality of mirroring queues in which to indicate the extent including destaged modified tracks, wherein mirroring queues having a higher priority than other queues are processed at a greater rate to determine extents of tracks to mirror from the cache to the secondary storage.

19. The system of claim 18, wherein the operations further comprise:
- processing a plurality of tracks in extents in the demote list to remove from the cache, wherein the extent information is gathered for the extents based on a status of the tracks in the extents when processed in the demote list to remove from the cache.

20. A method for mirroring extents of tracks at a primary storage to a secondary storage, comprising:
- incrementing a number of destaged modified tracks in extent information for an extent of tracks in a cache in response to destaging a modified track of the extent, wherein the modified track is indicated in an active cache list;
- indicating the destaged modified track in a demote list, wherein the demote list is used to determine destaged modified tracks to remove from the cache; and
- using the extent information for the extent to determine one of a plurality of mirroring queues in which to indicate the extent, wherein a mirroring queue having a higher priority than another mirroring queue is processed at a higher rate to determine extents of tracks to mirror from the cache to the secondary storage.

21. The method of claim 20, wherein the extent information additionally indicates at least one of a total number of tracks destaged for the extent and a number of modified tracks in the extent destaged with temporal bits set to off, wherein a temporal bit indicates a duration of a track in the cache.

22. The method of claim 20, wherein a mirroring queue having a higher priority than another mirroring queue is for extents having a greater number of modified tracks than extents in the mirroring queue having a lower priority.

23. The method of claim 20, wherein the demote list comprises a least recently used (LRU) list having a most recently used (MRU) end, further comprising:
- determining whether a track indicated at an LRU end of the demote list has modified data and has not been added back to the MRU end from the LRU end while in the demote list;
- moving the track at the LRU end to the MRU end in response to determining that the track at the LRU end has modified data and has not been added back to the MRU end from the LRU end while in the demote list; and
- removing the track at the LRU end in response to determining at least one of that the track does not have modified data and the track is modified and has been added back to the MRU end from the LRU end of the demote list.

24. The method of claim 20, wherein the extent information comprises destage extent information for extents destaged from the cache, further comprising:
- maintaining demote extent information that indicates for extents indicated in the demote list a number of modified tracks in the extent; and
- using the demote extent information for an extent to determine whether to move indication of an extent in one of the mirroring queues to a higher priority mirroring queue associated with extents having a greater number of modified tracks.

25. The method of claim 24, wherein the using the demote extent information for the extent to determine one of the mirroring queues in which to indicate the extent comprises:
- calculating a priority factor based on the demote extent information; and
- moving indication of the extent to a higher priority queue in response to determining that the priority factor exceeds a threshold.

* * * * *